United States Patent
Nakamura

(10) Patent No.: US 8,117,945 B2
(45) Date of Patent: Feb. 21, 2012

(54) HOLLOW SPEED REDUCER

(75) Inventor: Koji Nakamura, Tsu (JP)

(73) Assignee: Nabtesco Corporation, Tokyo (JP)

( * ) Notice: Subject to any disclaimer, the term of this patent is extended or adjusted under 35 U.S.C. 154(b) by 772 days.

(21) Appl. No.: 12/088,118

(22) PCT Filed: Sep. 26, 2006

(86) PCT No.: PCT/JP2006/319071
§ 371 (c)(1),
(2), (4) Date: Mar. 26, 2008

(87) PCT Pub. No.: WO2007/034964
PCT Pub. Date: Mar. 29, 2007

(65) Prior Publication Data
US 2009/0233750 A1 Sep. 17, 2009

(30) Foreign Application Priority Data
Sep. 26, 2005 (JP) ................................ 2005-278635

(51) Int. Cl.
*F16H 35/00* (2006.01)
(52) U.S. Cl. .......................................... 74/640; 475/163
(58) Field of Classification Search ................. 475/162, 475/163; 74/640
See application file for complete search history.

(56) References Cited

U.S. PATENT DOCUMENTS

| | | | | |
|---|---|---|---|---|
| 3,709,059 A | * | 1/1973 | Elsel | 74/661 |
| 4,431,366 A | * | 2/1984 | Inaba et al. | 414/735 |
| 4,624,621 A | * | 11/1986 | Murakami et al. | 414/735 |
| 4,787,262 A | * | 11/1988 | Kozawa et al. | 74/490.06 |
| 7,086,309 B2 | * | 8/2006 | Stoianovici et al. | 74/640 |
| 7,243,574 B2 | * | 7/2007 | Biester | 74/640 |
| 2001/0044356 A1 | | 11/2001 | Takeuchi et al. | |
| 2001/0046918 A1 | | 11/2001 | Spanski | |

FOREIGN PATENT DOCUMENTS

| | | |
|---|---|---|
| JP | 61055435 A | 3/1986 |
| JP | 4-115592 U | 10/1992 |
| JP | 07-108485 A | 4/1995 |
| JP | 8-22516 B2 | 3/1996 |
| JP | 08226498 A | 9/1996 |
| JP | 2001-218422 A | 8/2001 |
| JP | 2001-323972 A | 11/2001 |
| JP | 2002106650 A | 4/2002 |
| JP | 2002317857 A | 10/2002 |
| JP | 2002-349192 A | 12/2002 |
| JP | 2005-007532 A | 1/2005 |
| WO | 0165142 A1 | 9/2001 |

* cited by examiner

*Primary Examiner* — Ha D. Ho
(74) *Attorney, Agent, or Firm* — Panitch Schwarze Belisario & Nadel LLP

(57) ABSTRACT

A speed reducer capable of shortening a length in an axial direction of a turning structure by arranging a plurality of small-sized motors is provided. The hollow speed reducer 10 is a planetary gear apparatus having a crankshaft 11, a pinion 12 formed with outer teeth at an outer periphery thereof, fitted to a crank portion of the crank shaft 11 and eccentrically moved, and a case 13 an inner peripheral face of which is formed with inner teeth brought in mesh with the outer teeth of the pinion 12, in which an inner portion of the hollow speed reducer 10 is formed with a hollow hole, a center gear for an input of the hollow speed reducer 10 is provided at a position of the hollow hole, and small gears provided at output shafts of a plurality of motors 15 are simultaneously brought in mesh with the center gear.

3 Claims, 5 Drawing Sheets

HOLLOW SPEED REDUCER

CROSS-REFERENCE TO RELATED APPLICATION

This application is a Section 371 of International Application No. PCT/JP2006/319071, filed Sep. 26, 2006, which was published in the Japanese language on Mar. 29, 2007, under International Publication No. WO 2007/034964 A1, and the disclosure of which is incorporated herein by reference.

TECHNICAL FIELD

The present invention relates to a speed reducer used for a turning structure of a robot or reducing a speed of a motor output, further in details, relates to a hollow speed reducer including a hollow hole at a center portion of the speed reducer.

BACKGROUND ART

There is such a hollow speed reducer disclosed in, for example, Patent Reference 1 (JP-A-7-108485). According to Patent Reference 1, there is disclosed a rotation joint of a robot or the like characterized in a rotation joint of a robot or the like for decelerating a rotation output of a drive motor and rotating a rotation portion around a rotation axis center relative to a fixed portion, constituted by an outer bearing apparatus including a hollow speed reducer having an output portion for decelerating a rotation drive force of the drive motor to a rotation output around a predetermined axis center to transmit to the rotation portion and including a hollow cylindrical hole at a center portion, an outer bearing apparatus to which a stationary ring is locked by the fixing portion and in which a rotation ring is locked by an outer periphery of an output portion of the hollow speed reducer, and cylinder wall forming means provided at the hollow cylindrical hole of the hollow speed reducer and ensuring a cylinder region communicating utility regions on both sides in an axial direction of the hollow speed reducer to each other.

According to the speed reducer disclosed in Patent Reference 1, there is a problem that the motor is large-sized, and therefore, a turning structure is large-sized, particularly, a length in an axial direction is large.

As a countermeasure thereagainst, when a large output should be outputted by using a high speed/small sized motor and increase a speed reduction ratio of the speed reducer, in order to increase the speed reduction ratio, other speed reducing mechanism needs to be attached separately. Therefore, there is still other problem that the turning structure cannot be downsized.

Patent Reference 1: JP-A-7-108485
Patent Reference 2: JP-UM-A-4-115592
Patent Reference 3: JP-B-8-22516

PROBLEMS THAT THE INVENTION IS TO SOLVE

In view of the above-described problems of the background arts, it is an object of the invention to provide a speed reducer capable of shortening a length in an axial direction of a turning structure by providing a plurality of small-sized motors.

MEANS FOR SOLVING THE PROBLEMS

According to the invention, the above-described problem is achieved by a hollow speed reducer provided with a hollow hole at an inner portion thereof, wherein a center gear for an input of the hollow speed reducer is provided at a position coaxial with the hollow hole, and small gears provided at output shafts of a plurality of motors are simultaneously brought in mesh with the center gear.

In this case, the plurality of motors are provided to be equally distributed around a rotation axis of the center gear, thereby, a length in an axial direction of a turning structure can be shortened by the plurality of motors.

Further, when the plurality of motors are provided concentratedly at portions of a region around a rotation axis of the center gear, a pivoting member can be arranged skewedly by shortening the plurality of motors in the axial direction of the turning structure, which is convenient when used in a robot armor the like which includes an arm formed by connecting a plurality of pieces of blocks and in which faces of the respective blocks opposed to contiguous blocks are constituted by inclined faces in parallel with each other, the contiguous blocks are connected rotatably around axes orthogonal to the inclined faces, and a direction or a shape of the arm is changed, by pivoting the contiguous blocks around the axes by controlling rotation drive members included in the connecting portions by a microcomputer as described in Patent Reference 2 (JP-UM-A-4-115592).

The hollow speed reducer according to the invention may be a planetary gear apparatus comprising a crankshaft, a pinion formed with outer teeth at an outer periphery thereof, fitted to a crank portion of the crankshaft and eccentrically moved, and a case an inner peripheral face of which is formed with inner teeth brought in mesh with the outer teeth of the pinion as disclosed in, for example, Patent Reference 3 (JP-B-8-22516), or the hollow speed reducer may be a wave gear speed reducer comprising a wave generator, a flex-spline and a circular spline. According to the speed reducers, a large speed reduction ratio can be constituted and also operation thereof can be made to be smooth.

ADVANTAGE OF THE INVENTION

According to the invention, a plurality of drive motors can be constituted, an individual drive motor can be downsized, whereby a length in an axial direction of a turning structure can be shortened.

Further, according to the invention, a speed reducer used in a background art can be used as it is, the structure per se is not considerably changed and manufacturing thereof is facilitated.

Further, according to the invention, a plurality of motors are used, and therefore, even when one of the plurality of motors is failed, the machine can continuously be driven by a remaining motor. Thereby, even when a robot is failed, a time period of stopping a manufacturing line can be reduced more than that of the background apparatus.

Further, in an operation of interchanging a portion of motors by a failure or the like, currently, a mechanical lock is separately prepared between a pivoting portion and a fixed portion in the motor interchanging operation. In contrast thereto, according to the invention, a motor which is not interchanged can be utilized as an attitude maintaining brake, and by utilizing the motor which is not interchanged as the attitude maintaining brake in this way, the interchanging operation can be carried out without preparing the mechanical lock as described above, and the operation is extremely facilitated. Further, at this occasion, all of the motors are not completely detached, and therefore, according to the speed reducer of the invention, an original point returning operation of the robot can extremely easily be carried out.

BRIEF DESCRIPTION OF THE DRAWINGS

FIG. 1A is a plan view of a first embodiment constituting a turning mechanism of a robot arm by using a planetary gear apparatus as a hollow speed reducer according to the invention.
FIG. 1B is a plan view of a second embodiment constituting a turning mechanism of a robot arm by using a planetary gear apparatus as a hollow speed reducer according to the invention.
FIG. 1C is a vertical sectional view of the first or the second embodiment.
FIG. 2A is a plan view of other embodiment constituting a turning mechanism of a robot arm by using a planetary gear apparatus as a hollow speed reducer according to the invention.
FIG. 2B is a vertical sectional view of the other embodiment.
FIG. 3 is a vertical sectional view showing an embodiment of constituting a turning mechanism of a robot arm by using a wave gear speed reducer as a hollow speed reducer according to the invention.

BEST MODE FOR CARRYING OUT THE INVENTION

Figure 1A:
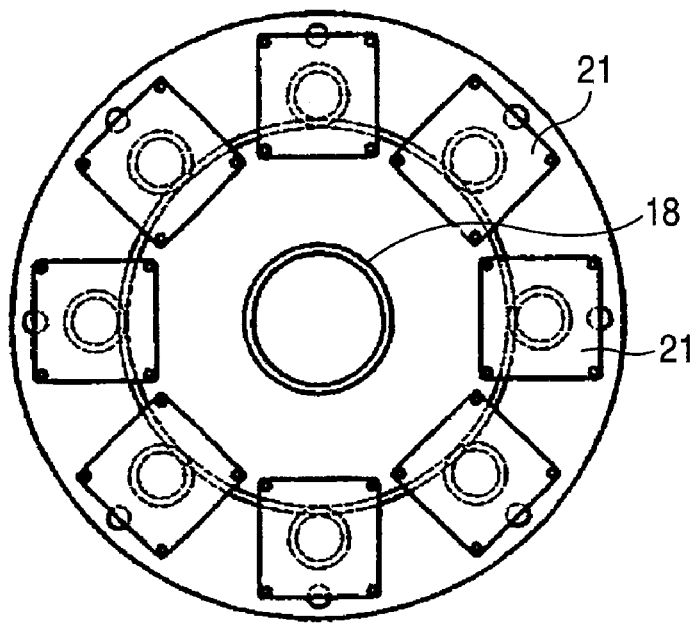
[FIG. 1A]
Figure 1B:
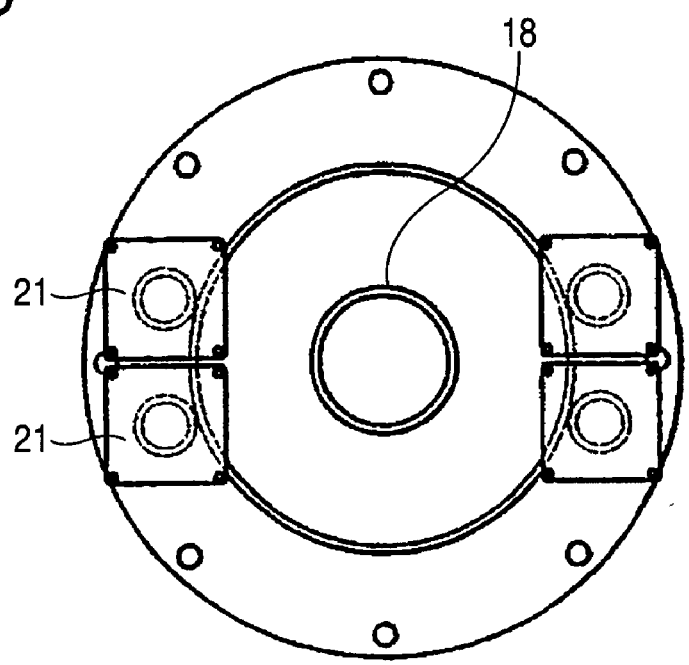
[FIG. 1B]
Figure 1C:
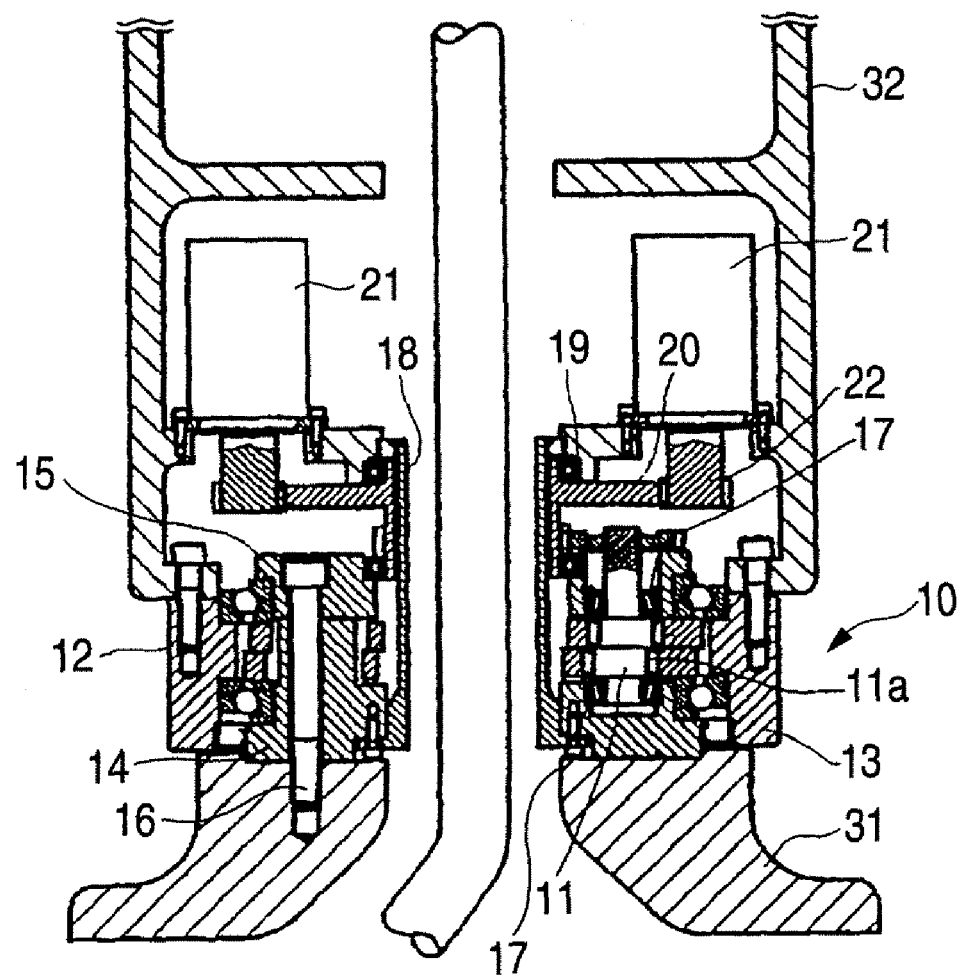
[FIG. 1C]

A number of embodiments of the invention will be explained in reference to the attached drawings as follows. FIGS. 1A through C show an embodiment of constituting a turning mechanism of a robot arm by using a planetary gear apparatus as a hollow speed reducer according to the invention, FIG. 1A is a plan view of a first embodiment, FIG. 1B is a plan view of a second embodiment, and FIG. 1C is a vertical sectional view of the first or the second embodiment.

In FIG. 1C, a hollow speed reducer 10 of the embodiment is a planetary gear apparatus comprising a crankshaft 11, a pinion 12 formed with outer teeth at an outer periphery thereof, fitted to a crank portion 11a of the crankshaft and eccentrically moved, and a case 13 an inner peripheral face of which is formed with inner teeth brought in mesh with the outer teeth of the pinion 12. The pinion 12 includes the outer teeth of a tooth shape comprising an equal distance curve to a pericycloidal curve at an outer peripheral face thereof.

A support circular plate 14 and an end circular plate 15 of upper and lower sides of the hollow speed reducer 10 are integrally connected by a bolt 16, further, the support circular plate 14 is fastened to attach to a frame base 31 of a robot arm by the bolt 16. The case 13 of the hollow speed reducer 10 is rotatably supported at outer peripheral portions of the support circular plate 14 and the end circular plate 15 on upper and lower sides by a bearing.

The crankshaft 11 is rotatably supported by upper and lower bearings 17 between the support circular plate 14 and the end circular plate 15. The crankshaft 11 includes two crank portions eccentrically arranged from a rotation axis by predetermined distances, and the pinion 12 is fitted to the crank portions.

An inner portion of the hollow speed reducer 10 is formed with a hollow hole by a hollow circular pipe 18. One end of the hollow circular pipe 18 is fixed to the support circular plate 14, and other end thereof is brought into contact with an output member, mentioned later, by way of an oil seal. An outer periphery of the hollow circular pipe 18 is loosely fitted with a center gear 20, and the center gear 20 is rotatably supported by a bearing 19. Further, cables are passed through a hollow portion of the hollow gear speed reducer (hollow portion of the hollow circular pipe 18).

At positions of an outer peripheral portion of the center gear 20, eight motors 21 are provided to be distributed equally around a rotation axis center of the center gear 20 in the embodiment shown in FIG. 1A, further, in an embodiment shown in FIG. 1B, respective twos of motors 21 are provided at two portions opposed to each other. Output shafts of the respective motors 21 are fastened to be attached with small gears 22 and the small gears 22 are brought in mesh with the center gear 20.

According to the embodiment comprising the above-described constitution, rotation of the respective motors 21 is transmitted from the small gears 22 to the center gear 20, the crankshaft 11 is rotated by rotation of the center gear 20 to generate a crank movement, and the case 13 is rotated by way of a planetary movement of the pinion 12 fitted to the crankshaft by reducing a speed thereof. Thereby, an output member 32 of a robot fastened to be attached to the case 13 of the hollow speed reducer 10 is turned by a decelerated speed. Further, according to the embodiment, the turning angle of the output member 32 is within 360°.

According to the embodiment, a plurality of the drive motors 21 can be constituted, the individual drive motor 21 can be downsized, thereby, a length in an axial direction of a turning structure can be shortened. Further, the hollow speed reducer 10 which has been used in a background art can be used as it is, and manufacturing thereof is facilitated without changing the structure per se considerably. Further, even when one of the plurality of motors 21 is failed, the machine can continuously be driven without being stopped by the remaining motor 21. Thereby, even when the robot is failed, a time period of stopping a manufacturing line can be reduced more than the background art apparatus.

Further, in an operation of interchanging the motor 21 by a failure or the like, the motor 21 which is not to be interchanged can be utilized as an attitude maintaining brake. Thereby, although a mechanical lock is separately prepared currently between a pivoting portion and a fixed portion, an interchanging operation can be carried out without preparing such a mechanical lock and the operation is extremely facilitated. Further, the motors 21 are not completely detached, and therefore, according to the speed reducer of the invention, an original point returning operation of the robot can be carried out extremely easily.

Further, when the plurality of motors are installed to be equally distributed around the rotation axis as in the embodiment illustrated in FIG. 1A, the turning structure can be shortened in the axial direction. Further, when the plurality of motors are respectively provided concentratedly at 180° symmetric positions relative to the rotation axis as in FIG. 1B, in addition to the above-described advantage, there can also be achieved an effect of facilitating arrangement of cables, pipings or the like, and capable of arranging a support shaft or a drive shaft in a direction orthogonal to the rotation axis of the speed reducer.

Figure 2A:
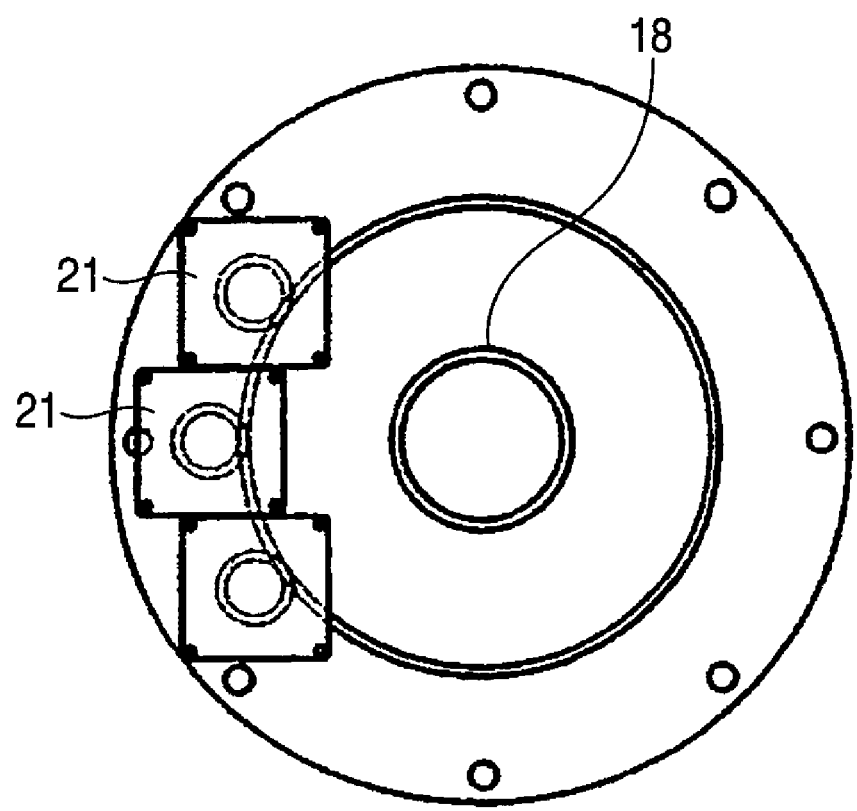
[FIG. 2A]
Figure 2B:
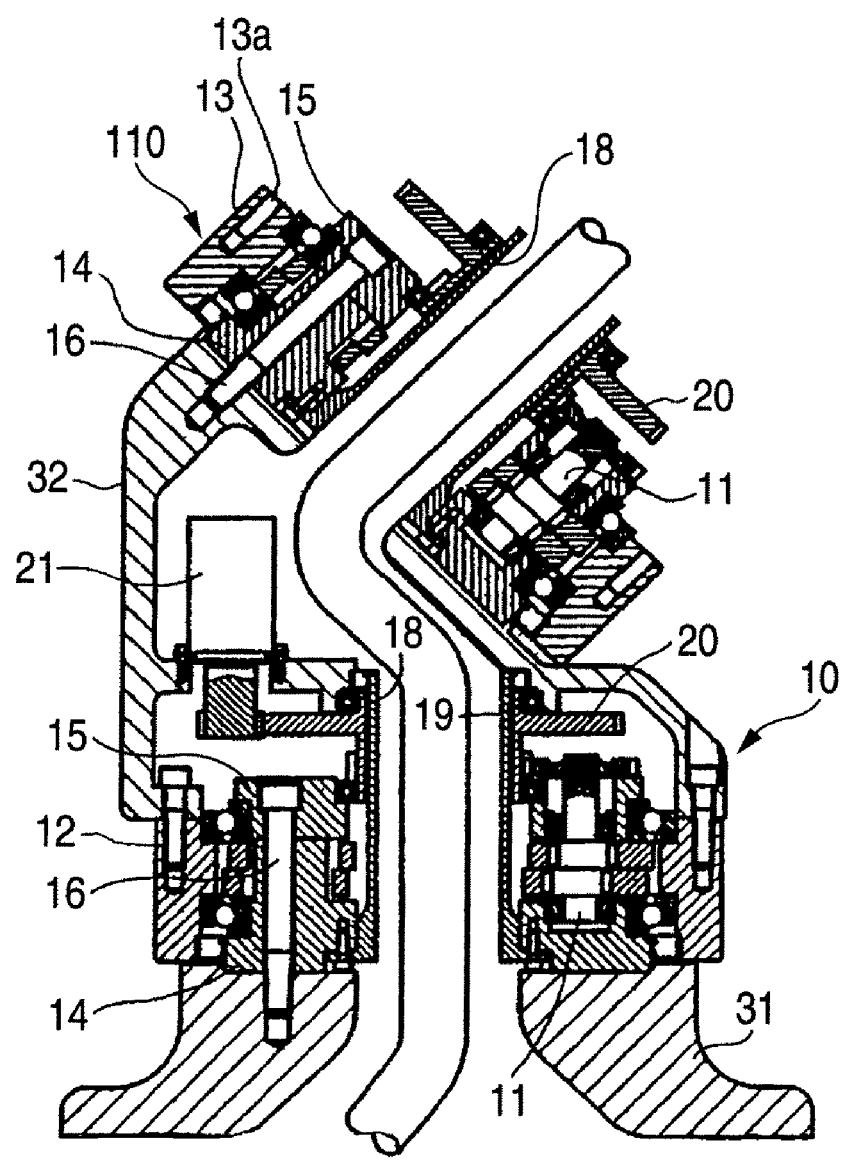
[FIG. 2B]

FIGS. 2A through 2B show other embodiment constituting a turning mechanism of a robot arm by using a planetary gear apparatus as a hollow speed reducer according to the invention, FIG. 2A is a plan view, and FIG. 2B is a vertical sectional view.

As shown by FIG. 2B, an upper end of the output member 32 of the embodiment shown in FIGS. 1A through 1C is inclined, and a front end portion of the inclined output member 32 is provided with a second hollow speed reducer 110 having a structure similar to that of the hollow speed reducer 10 of the above-described embodiment. That is, the support circular plate 14 and the end circular plate 15 on upper and lower sides of the second hollow speed reducer 110 are integrally connected by the bolt 16, further, the support circular plate 14 of the hollow speed reducer 110 is fastened to be attached to the output member 32 of the hollow speed reducer 10 by the bolt 16. Other structure of the hollow speed reducer 110 is similar to that of the hollow speed reducer 10, the same members are attached with the same citation notations and detailed explanation thereof will be omitted.

The center gear 20 of the hollow speed reducer 110 is connected with a motor (not illustrated) similar to the above-described motor 21. A second output member (not illustrated) is screwed to be attached to a screw hole 13a of the case 13 of the hollow speed reducer 110.

The hollow speed reducer 110 on an upper side is rotated to be driven integrally with the output member 32 of the hollow speed reducer 10 on a lower side, and rotation of the motor attached to the hollow speed reducer 110 on the upper side is reduced in a speed thereof by the hollow speed reducer 110 on the upper side to thereby turn the second output member.

According to the above-described embodiments, the hollow speed reducers 10 and 110 are planetary gear apparatus each comprising the crankshaft 11, the pinion 12 formed with the outer teeth on the outer periphery, fitted to the crank portion 11a of the crankshaft 11 and eccentrically moved, and the case 13 the inner peripheral face of which is formed with the inner teeth brought in mesh with the outer teeth of the pinion 12. However, according to the invention, the hollow speed reducer can also be constituted by wave gear speed reducer comprising a wave generator 220, a flex-spline 230 and a circular spline 240.

An explanation will be given of an embodiment using a wave gear speed reducer as a hollow speed reducer according to the invention and constituting a turning mechanism of a robot arm in reference to FIG. 3 as follows.

Figure 3:
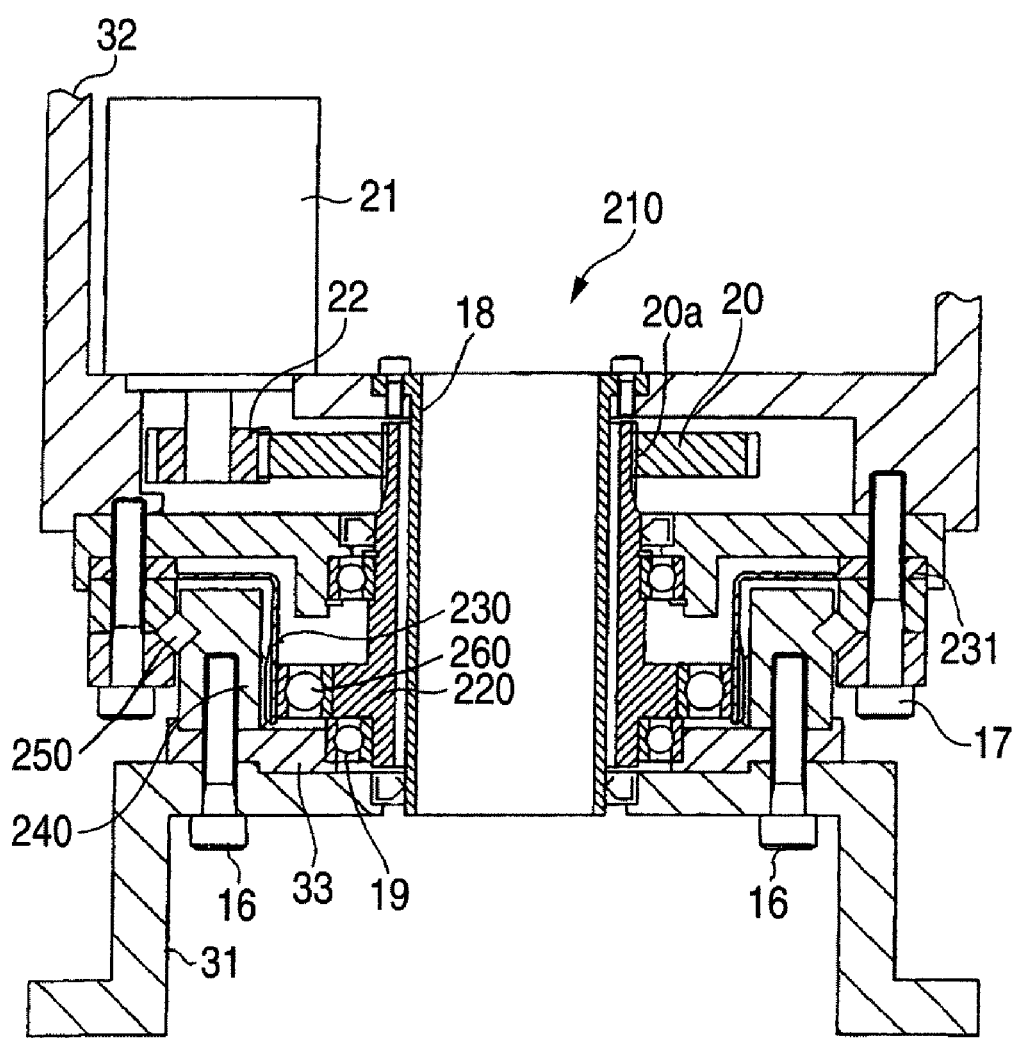
[FIG. 3]

In FIG. 3, a hollow wave gear speed reducer 210 is constituted by the wave generator 220, the flex-spline 230 and the circular spline 240. A first sub plate 33 and the circular spline 240 of the hollow speed reducer 210 are fastened to attach to the frame base 31 of the first arm of the robot by the bolt 16.

An outer periphery of the circular spline 240 is arranged with a cross roller bearing 250. An inner ring of the cross roller bearing 250 is integrally formed with the circular spline 240, and an outer ring of the cross roller bearing 250, a fixing portion 231 of an end portion of an outer side of the flex-spline 230 and a second sub plate 34 of the hollow speed reducer 210 are fastened to attach to the output member 32 by a bolt 17. An inner side of the flex-spline 230 is engaged with the wave generator 220 by way of a bearing 260.

The wave generator 220 is rotatably supported by the first and the second sub plates 33 and 34 by a bearing 19. An inner portion of the hollow speed reducer 210 is formed with a hollow hole by the hollow circular pipe 18, one end of the hollow circular pipe 18 is fixed to the output member 32, and other end thereof is brought into contact with the frame base 31 of the first arm by way of an oil seal. An outer periphery of the hollow circular pipe 18 is loosely fitted with the wave generator 220, and the cables are passed through the hollow portion of the hollow gear speed reducer 210 (hollow portion of hollow circular pipe 18).

An upper end portion of the wave generator 220 is brought into spline-engagement 20a with the center gear 20. The plurality of motors 21 are provided at positions of the outer peripheral portion of the center gear 20, the small gears 22 are fastened to attach to the output shaft of the motor 21, and the small gear 22 is brought in mesh with the center gear 20. Further, the motor 21 can be arranged similar to the motor 21 of the embodiment mentioned above.

According to the embodiment, constructed by the above-described constitution, rotation of the motor 21 is transmitted from the small gear 22 to the center gear 20, the wave generator 220 is rotated by rotation of the center gear 20 and a wave movement is generated by the flex-spline 230 and the circular spline 240. Thereby, the output member 32 of the robot fastened to attach to the case 13 of the hollow speed reducer 210 is turned by a decelerated speed.

The invention claimed is:

1. A hollow speed reducer comprising a hollow hole at an inner portion thereof, wherein a center gear for an input of the hollow speed reducer is provided at a position coaxial with the hollow hole, small gears provided at output shafts of a plurality of motors are simultaneously brought in mesh with the center gear, and at least two motors of the plurality of motors are provided concentratedly at each portion of a plurality of portions of a region around a rotation axis of the center gear.

2. The hollow speed reducer according to claim 1, wherein the hollow speed reducer is a planetary gear apparatus comprising a crankshaft, a pinion formed with outer teeth at an outer periphery thereof, fitted to a crank portion of the crankshaft and eccentrically moved, and a case an inner peripheral face of which is formed with inner teeth brought in mesh with the outer teeth of the pinion.

3. A hollow gear speed reducer comprising a hollow hole at an inner portion thereof, a wave generator, a flex-spline and a circular spline, wherein a center gear for an input of the hollow wave gear speed reducer is provided at a position coaxial with the hollow hole, and small gears provided at output shafts of a plurality of motors are simultaneously brought in mesh with the center gear.

* * * * *